United States Patent
Nielsen

(10) Patent No.: US 8,200,701 B2
(45) Date of Patent: Jun. 12, 2012

(54) HANDLING OF DATA IN A DATA SHARING SYSTEM

(75) Inventor: Thomas Stig Nielsen, Højbjerg (DK)

(73) Assignee: Itelligence A/S, Horsens (DK)

( * ) Notice: Subject to any disclaimer, the term of this patent is extended or adjusted under 35 U.S.C. 154(b) by 233 days.

(21) Appl. No.: 12/081,704

(22) Filed: Apr. 18, 2008

(65) Prior Publication Data

US 2009/0132605 A1    May 21, 2009

Related U.S. Application Data

(60) Provisional application No. 60/912,840, filed on Apr. 19, 2007.

(51) Int. Cl.
*G06F 17/00* (2006.01)
(52) U.S. Cl. ......... 707/791; 707/802; 707/822; 707/828
(58) Field of Classification Search ........... 707/600–861
See application file for complete search history.

(56) References Cited

U.S. PATENT DOCUMENTS

| | | | | |
|---|---|---|---|---|
| 7,739,363 | B1 * | 6/2010 | Gaya | 709/223 |
| 2005/0197852 | A1 * | 9/2005 | Gebhard et al. | 705/1 |
| 2007/0288425 | A1 * | 12/2007 | Fuerst et al. | 707/2 |

FOREIGN PATENT DOCUMENTS

| | | | |
|---|---|---|---|
| WO | WO-2004/023335 | A2 | 3/2004 |
| WO | WO-2004/023339 | A2 | 3/2004 |

\* cited by examiner

*Primary Examiner* — Isaac M Woo
(74) *Attorney, Agent, or Firm* — Birch, Stewart, Kolasch & Birch, LLP

(57) ABSTRACT

A method of handling data in a data sharing system is provided. The data sharing system includes a set of data objects. Each data object includes an object type identifier and a set of attributes. The method includes coupling at least one set of object type identifier and attribute in accordance with a set of dependency rules.

20 Claims, 3 Drawing Sheets

HANDLING OF DATA IN A DATA SHARING SYSTEM

This Nonprovisional application claims priority under 35 U.S.C. §119(e) on U.S. Provisional Application No. 60/912,840 filed on Apr. 19, 2007, the entire contents of which are hereby incorporated by reference.

FIELD OF THE INVENTION

The present invention relates to data sharing systems and to processing, managing and handling of data in such systems.

BACKGROUND OF THE INVENTION

In a business organization, business related data and processes are normally handled by a computer system. Such systems typically include applications for dealing with aspects relating to manufacturing, supply chain, financials, etc. For such purposes an Enterprise Resource Planning systems (ERPs) may be applied. An example of a widely used ERP system is the SAP system. In an ERP system all data and processes of an organization are attempted to be integrated into a unified system, thereby avoiding compatibility problems between stand-alone applications. A key ingredient of most ERP systems is the use of a unified database to store data for various parties or sub-divisions of the organization. The unified database is often referred to as a master database for storing master data. The master data may be in the form of data objects with associated attributes that describe the various aspects of the object. The data objects may relate to all kinds of relevant entities such as products, bills of material, scheduling, capacity, inventory, order entry, customers, suppliers, etc.

A setting of a specific master data object may be closely related to other data objects in the database. For example in connection with creation or modification of data objects, e.g. a modification of a data objects relating to a material may influence a lot of other objects throughout the supply chain. The person responsible for the addition or modification should therefore be able to comprehend and deal with all other data objects which should be updated as a consequence. The responsible person also needs to understand the significance of the database entries. In a situation where the system behaves unexpectedly, the person should understand why the system behaves in a given way, and what could be the cause of this. The responsible person should also understand how to inform or consult relevant parties in connection with a change. Consequently it is a considerable task to maintain a master database.

Hence, an improved way of handling data in a data sharing system would be advantageous, and in particular a more efficient and/or reliable way would be advantageous.

SUMMARY OF THE INVENTION

The inventor of the present invention has realized that in order to efficiently maintain a data sharing database, it may on one hand be necessary to maintain the database on a central level to ensure constant high quality and consistency of the data, so that all relevant data attributes are addressed, etc. On the other hand it may nevertheless be necessary to maintain the database de-centrally, since the knowledge of the data and especially about the quality of the data is typically only available at the location where the data in question is typically dealt with.

To this end, it may be seen as an object of the present invention to provide a data sharing system that solves the above mentioned problems of the prior art with maintaining a master database. And in particular it may be seen as an object of the present invention to provide a data sharing system, which may efficiently be maintained de-centrally in a way where the benefits of central administration are still obtained.

It is a further object of the present invention to simplify handling and maintenance of data in a database system.

Thus, the above described objects and several other objects are intended to be obtained in a first aspect of the invention by providing a method of handling data in a data sharing system, the data sharing system comprising:

a set of data objects, each data object comprising an object type identifier and a set of attributes;

the method comprising coupling at least one set of: object type identifier and attribute in accordance with a set of dependency rules.

It is a particular, but not an exclusive, advantage of the present invention that by coupling object type identifiers and attributes, a number of decisions are included in the system and a number of tasks such as the physical tasks relating to maintaining the data objects may be dealt with in a way so that only a minimal number of user actions are required. Maintenance of the database is thereby rendered efficient.

It is an advantage of the present invention that the dependency rules may be maintained centrally so that any coupling between object type identifiers and attributes may be defined centrally, so that no, or at least only minimal, de-central knowledge of dependencies between data objects may be necessary. By virtue of the dependency rules, it may be ensured that relevant objects and attributes are addressed in connection with a modification. By addressing relevant objects and attributes, consistency of the data may be ensured across the data objects.

The coupling between at least one set of object type identifier and attribute, may include at least a coupling between one object type identifier and another object type identifier, or a coupling between one attribute and another attribute, or a coupling between one object type identifier and one attribute. Typically, a number of couplings are established by the dependency rules.

The invention may advantageously be applied for any type of data sharing system. However, the invention is particularly advantageous for data sharing systems, where data objects are stored and maintained in a unified database system, such as data sharing systems of the ERP type. The unified database may be distributed over a number of server machines. The invention may also be advantageously implemented for data sharing systems of the Advanced Planning & Scheduling (APS) type and Customer relationship management (CRM) type. APS systems handle the manufacturing management process, whereas CRM systems handle an organization's relationships with customers.

The set of data objects may comprise a subset of global data objects and a subset of local data objects. It may be advantageous to split up the data objects into subsets relating to data objects which are globally applied throughout an organization, and data objects which are applied at various locations throughout an organization. Embodiments of the present invention may advantageously be applied for ensuring consistency and quality between global data and local data. Moreover, local data may to a large extend be duplicated at a number of different locations. By application of dependency rules, it may be ensured that such duplication may be performed without introducing errors from the duplication process itself. Moreover, it may, at least to a large extend, be performed automatically and thereby efficiently across locations of an organization.

The dependency rules may be customized to a specific business operation. For example, a dependency rule may be customized to such business operations as sale from location A to location B. Data objects involved in such an operation may be coupled by the set of dependency rules. The dependency rules may be customized to any type of business operation, such as operations relating to purchase, production, sales, storage, etc., thereby rendering the dependency rules business oriented instead of system oriented. A business oriented system may be more efficient and more intuitive to work with for the user.

The dependency rules may operate on the attributes. In advantageous embodiments, the dependency rules may specify a mapping between a first set of attributes to a second set of attributes; either between two data objects or within the same data object. The mapping may be executed either by setting attributes of the second set of attributes independent of a setting of the first set of attributes, or by basing the second set of attributes on attributes of the first set of attributes.

The dependency rule may also operate on the data object. In advantageous embodiments, the dependency rules may specify how to maintain data objects, e.g. to create or delete a data object.

It is an advantage of embodiments of the present invention that it may be ensured that objects and attributes are maintained automatically to a large extend. However it may not be possible in all situations to automatically maintain the data objects. To ensure that a user is consulted, or if it is not possible to automatically maintain the data object, the dependency rule may specify to request user input. In an embodiment, a user may also be requested to consider the validity of data, for example to ensure validity of basic data which by virtue of the dependency rules are coupled to potentially a large number of data objects and attributes.

In data sharing systems, such as an ERP system, a pool of attributes may be predefined. Some of these attributes may be relevant and some may not be relevant, moreover in dependency upon a given situation, the relevancy may change. To ensure that relevant attributes are addressed, the dependency rule may specify idle and active attributes.

A given task may involve a number of data objects, each data object may have assigned a number of attributes. Dependency rules may couple a number of objects and attributes. To ensure that all tasks as specified by the dependency rules are carried out, the set of dependency rules may be correlated to a workflow for arranging the execution of the set of dependency rules.

The workflow may in an advantageous embodiment be implemented in a request system that is executed as a computer program. The request system may be implemented to be executed via a computer network, such as the Internet or an Intranet, such that it may be ensured that a user can access the system at any location throughout the organization and at the same time it may be ensured that all locations work on a single data sharing system, so that independent subsystems are avoided.

The application of a work flow in connection with a request system may also facilitate data verification of various kinds, for example in connection with authorizing user rights for a given action, verification of the naming of a product in accordance with company rules, etc.

In second aspect, the invention relates to a data sharing system for implementing the method of the first aspect. The data sharing system may include one or more client systems and a central system for storage and handling of data objects. The central system may be implemented on a distributed system.

In a third aspect, the invention relates to a computer program product for implementing the method of the first aspect. The computer program product may be implemented as an integrated part of a data handling system in accordance with the first and second aspect of the invention, or may be implemented as an add-on or update in order to bring a data handling system to operate in accordance with embodiments of the present invention.

The individual aspects of the present invention may each be combined with any of the other aspects. These and other aspects of the invention will be apparent from the following description with reference to the described embodiments.

BRIEF DESCRIPTION OF THE FIGURES

Embodiments of the invention will be described, by way of example only, with reference to the drawings, in which.

DESCRIPTION OF EMBODIMENTS

Figure 1:
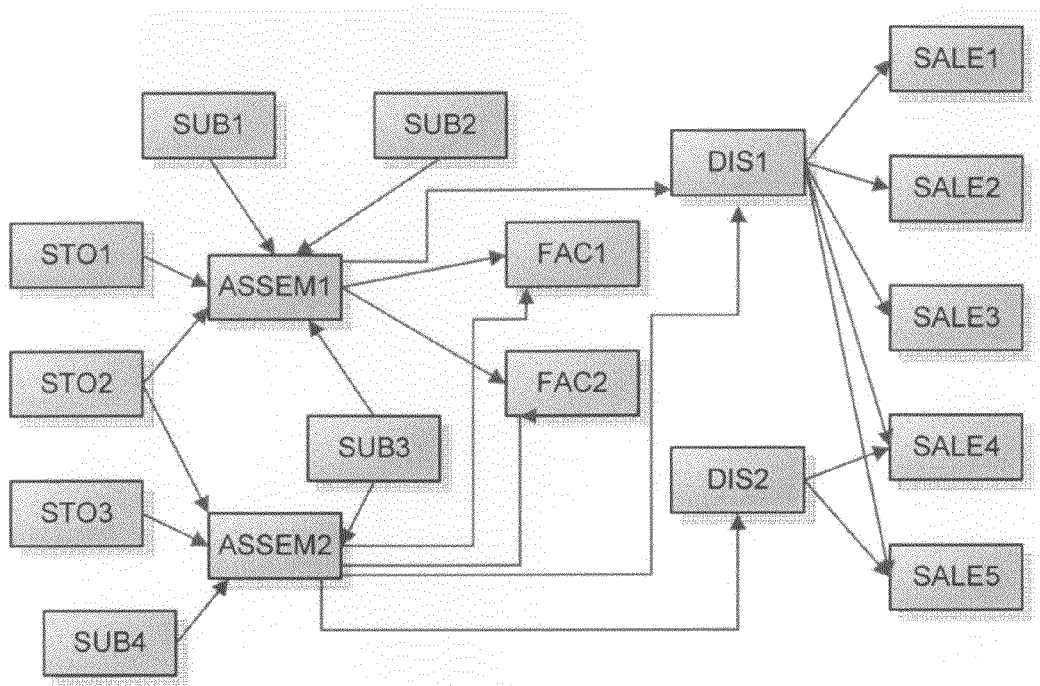
FIG. 1 illustrates an exemplary overview diagram of interrelations of a production company and associated parties.

Medium to large scale businesses are normally organized in a complex manner. FIG. 1 illustrates an exemplary overview diagram of interrelations of a production company and associated parties, including partners, sub-contractors and sub-divisions. As an example, the company sells a variety of goods each being based on a number of parts. The company may include a number of assembly plants, here exemplified by ASSEM1 and ASSEM2. Each assembly plant may be linked to a number of other divisions and parties. For example, each assembly may be linked to a number of storages STO1 to STO3, may be linked to a number of sub-contractors SUB1 to SUB4, and may be linked to a number of factories FAC1 and FAC2. Based on the parts received at the assembly plants from the various sub-contractors, storages and factories, a number of products may be assembled and may be transferred to a number of distribution centers DIS1 and DIS2, and each distribution centre may be linked to a number of sale locations SALE1 to SALE5.

Interrelations between parties in a business may be complex even with a relative small number of relations. In order to handle a proper flow of the supply chain from vendor to customer, to handle the manufacture process, and other relevant processes, an electronic data sharing system may be used.

Embodiments of the present invention are directed to a method of handling data in a data sharing system, the data sharing system comprising a set of data objects, each data object comprising an object type identifier and a set of attributes.

In an embodiment of the data sharing system, a central or distributed database is set up which stores data for the relevant data objects, this data is in a variety of applications referred to as master data. The data object may define data relating to customers, to vendors, to goods, to various material, etc., where the object type identifier specifies the specific type or nature of the data object, and the attributes describe the various aspects and data relating to the object.

In an embodiment, the set of data objects is distributed into
- a subset of global data objects, each global data object comprising a global object identifier and a set of global attributes; and
- a subset of local data objects, each local data object comprising a local type identifier and a set of local attributes.

Global data objects relates to data which globally applies to a specific data object through out the organization; and local data which is data that is dependent upon the specific type of entity in the organization.

Examples of global data objects include data object for defining a specific product, a customer, a vendor, a specific material, etc. Examples of local data objects include the same type of objects, but specified for a given entity or location in the organization. For example, data which is only relevant for specific customers, specific sales companies, specific distribution centers, specific production companies, specific sub-contractors, specific vendors, etc.

With reference to FIG. 1, global data is data which applies to all entities of the depicted organization, whereas local data is data which applies only to a specific entity, or group of entities, of the organization.

Figure 2:
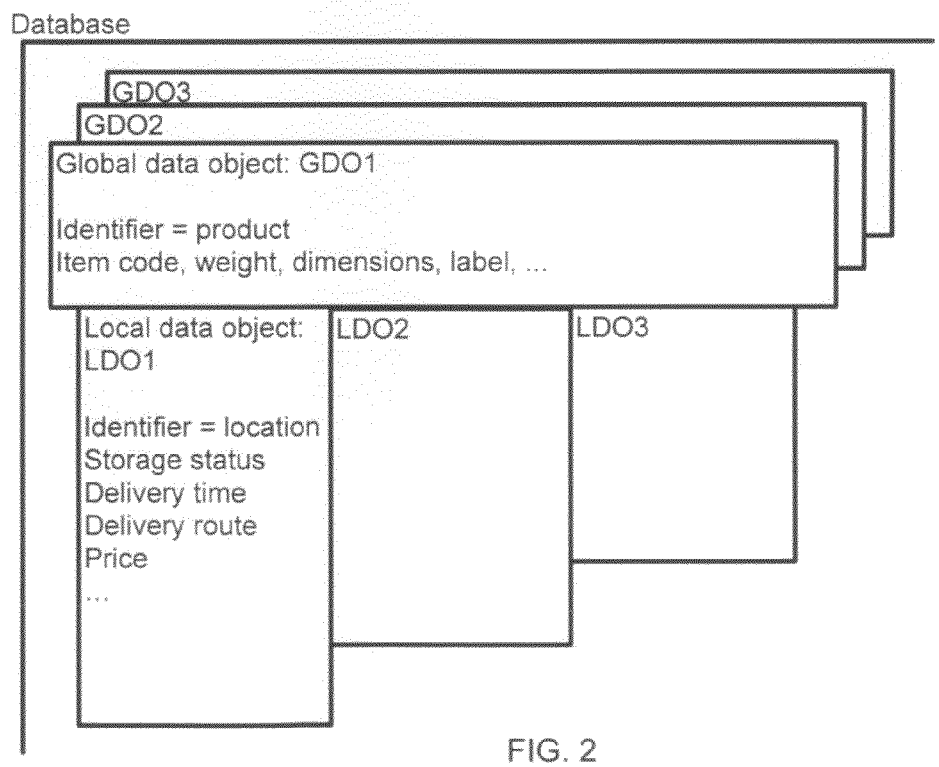
FIG. 2 schematically illustrates global and local data objects.

An exemplary embodiment illustrating global and local data objects is provided in FIG. 2. FIG. 2 illustrates a database comprising a number of global data objects GDO. A specific product may be described by a global data object, by specifying an item code, total weight, characteristic dimensions, a description label in the group language, etc. Moreover, the data object also comprises a type identifier to specify the type identity of the data object. Here the type identifier may be set as a product, the type identifier may also be more specific, such as a specific class of products.

The global data object may be associated to a number of local data objects LDO, specifying local data. This data may be data which is specific to the type of entity, for example, a local data object may be provided for each sale location which sells the product. A local data object may be provided for each distribution center which stores and distributes the product, etc. As an example, a specific product may be described by a local data object, by specifying local storage status, delivery time if reordered, delivery route, price, etc. Moreover, the data object also comprises a type identifier to specify the type identity of the data object. Here the type identifier may be set as a location.

The database may be implemented on a computer system, such as a client-server system, such that users are able to access, view and maintain the data of the database.

In a computer system for storing and handling the master data of the prior art, such as a SAP system, it is up to the user to ensure that whenever a new global or local entry is inserted in the system all relevant fields are attributes are addressed, or whenever an existing global or local entry is updated, all relevant attributes are updated as well. For example, when a new global object is added, the user should ensure that the relevant associated local objects are also added, and moreover, for each global and local data object which attributes are to be set.

To illustrate the complexity relating to adding a new product in the database of a SAP system an illustrative example is first provided. For each product, inspection has revealed that there may typically be approximately 73 attributes to consider. Of these attribute settings, 17 may relate to global attributes, e.g. weight, size, etc. The remaining 56 may relate to local attributes, e.g. time of delivery, delivery route, planning strategy, etc. In a situation of 4 production locations and 35 sales locations, the total number of attributes to consider amounts to more than 2000. In this example only the addition of a single product is considered, when thousands or even hundreds of thousands of products are added over time, it becomes clear that it is a tremendous task to maintain the database.

Data sharing systems in accordance with the present invention are provided so that at least one set of: object type identifier and attribute is coupled in accordance with a set of dependency rules.

A dependency rule typically specifies a link either between attributes of the same object, or between two objects or between a number of objects. A dependency rule may map one set of attributes of an objects to another set of attributes of the same object or another object.

An ERP system, such as the SAP system, comprises a number of predefined object types, and for each of the object types a predefined set of possible attributes are possible. For a given company some attributes are relevant, whereas others are not. Each attribute is defined in terms of a descriptor and a field. The descriptor is predefined, whereas the field is used for the relevant setting of the attributes. In dependence upon the type of attribute, the field may typically be filled out by a numeric value or a text string.

In an exemplary embodiment, a dependency rule may be organized in terms of a profile. A profile is a listing of dependent objects and a listing of dependent attributes and rules dictating how to set these attributes. A profile may also point to another profile.

Figure 3A:
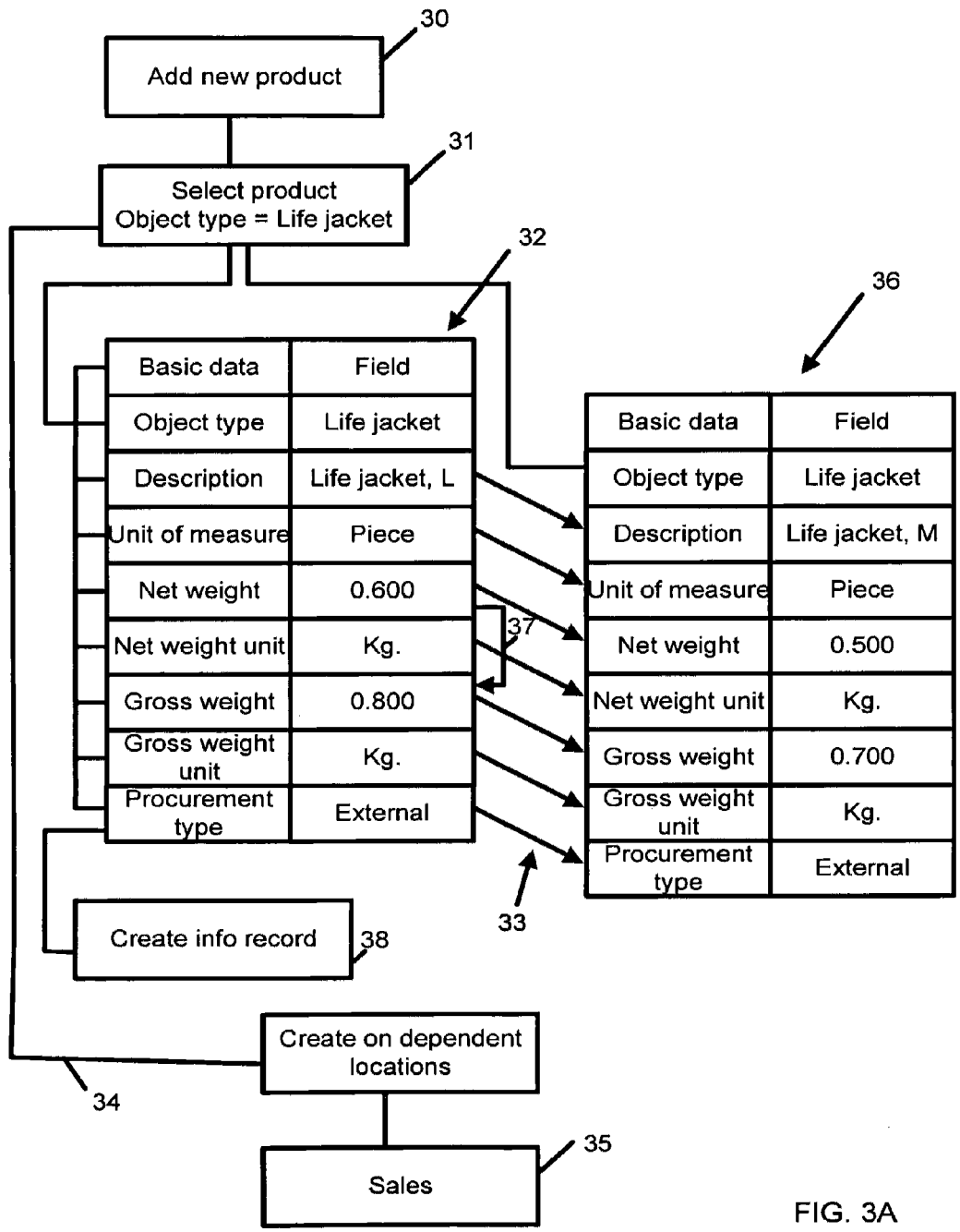
FIGS. 3A and 3B illustrate exemplary embodiments of couplings between object type identifiers and attributes within data objects.
Figure 3B:
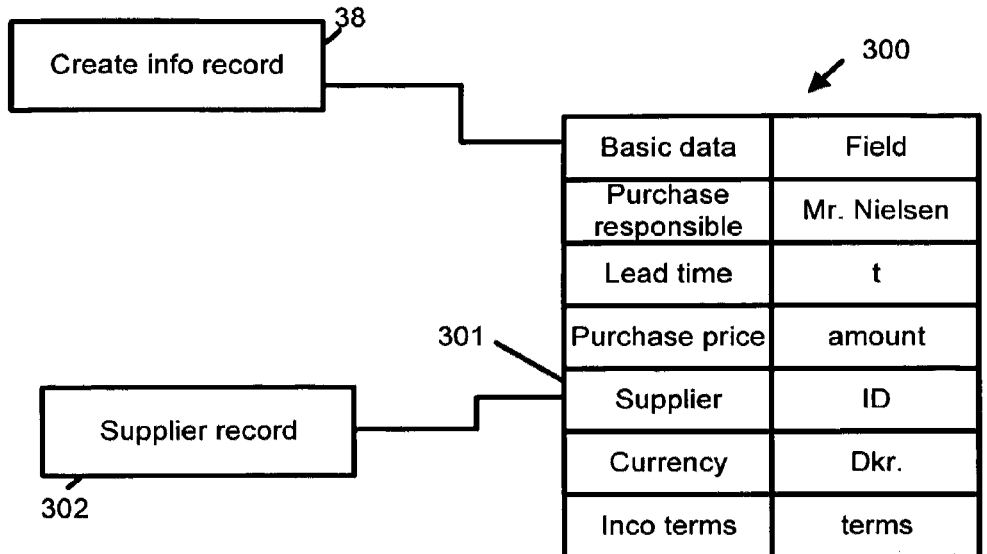

FIGS. 3A and 3B illustrate exemplary embodiments of couplings between object type identifiers and attributes within data objects.

When a user requests to insert a new data object, dependency rules may be set up for the data object to ensure that relevant data object are created, and relevant attributes are provided and set properly.

In FIG. 3A the user may first request to add a new product 30. The user may then select from a menu of possible product groups and thereby specify the object type by selecting the object type identifier 31, here exemplified by the global data object relating to a life jacket. The user may e.g. select the object type identifier from a drop down menu containing the possible objects to be created. The object type identifier life jacket is in the data sharing system coupled to a set of attributes 32 in accordance with a set of dependency rules, and moreover it is also coupled to other data objects 34, 36, 38 and associated set of attributes in accordance with the set of dependency rules. Here the data object is schematically illustrated as a table of attributes in terms of a descriptor referred to as basic data and fields containing the setting of the attributes. By selecting the object identifier life jacket, a set of dependency rules specifies, from the pool of predefined attributes, the attributes that should be active for this object type as well as specifying at least some of the settings of the attributes. Relevant attributes are thereby selected.

Dependency rules may be set up, so that when a new object type of the type life jacket is created a number of dependent objects are also created. This is exemplified by the creation of an additional global data object 36 of the same type being life jacket, but for another product. In the current example, the first object relates to life jackets of size L, whereas the second object relates to life jackets of size M. By selecting the object identifier, dependent attributes may be selected and relevant fields filled out. In some cases the number of fields a user has to consider may thereby be reduced up to 90%.

The dependency rule may specify a mapping between the set of attributes for a first data object, i.e. for the life jacket of size L to a second set of attributes for the same data object. For example, once the net weight is given, the gross weight may be provided by adding 200 grams. The mapping is illustrated by the arrow 37.

The dependency rule may specify a mapping between a first set of attributes for a first data object to a second set of attributes for a second data object, i.e. to the life jacket of size M. The mapping is illustrated by the arrows 33. Thus, once the attributes, or field values, of the first object are known, also the attributes of the second object are provided.

The mapping between the first and second set of attributes may be executed by setting attributes of the second set of attributes in accordance with a setting known to the dependency rule, but independent of a setting of the first set of attributes. Alternatively, the setting of the second set of attributes may be based on attributes of the first set of attributes.

A dependency rule 34 may also dictate that the creation of a new product of the type life jacket ensures that local data objects are created as well. For example, a local object may be created for each sales company 35, which specifies local attributes, such as local price, delivery route to local sales location, estimated delivery time, etc. Moreover, the dependency rule may specify to request user input.

FIG. 3A is schematically illustrates the creation of an additional global data objects 36 of the same type but for a different product. FIG. 3B schematically illustrates further details relating to the creation of a different dependent data object for the same product.

By specifying the procurement type, a dependency rule may specify to create an info record 38 which is associated to the procurer. In an exemplary embodiment, an info record as schematically illustrated in FIG. 3B, is created 38 in dependency upon setting the procurement type to external. Some attributes may be pre-set by virtue of dependency rules, e.g. the lead time may be known. Other attributes may be filled out in accordance with dependency rules linked them to a given data object. For example, the supplier ID 301 may be fetched from a supplier record 302. For example, a supplier may be selected from a drop down menu, and once a specific supplier is selected, relevant information is fetched from the selected supplier record.

The examples given in connection with FIG. 3 describe the creation of objects and the setting of attributes. It is also within the scope of the invention to apply dependency rule which specifies to delete a data object, as well as to maintain a data object, e.g. updating attributes of a data object. In general, dependency rules may be applied in connection with all aspects of database maintenance.

Figure 4:
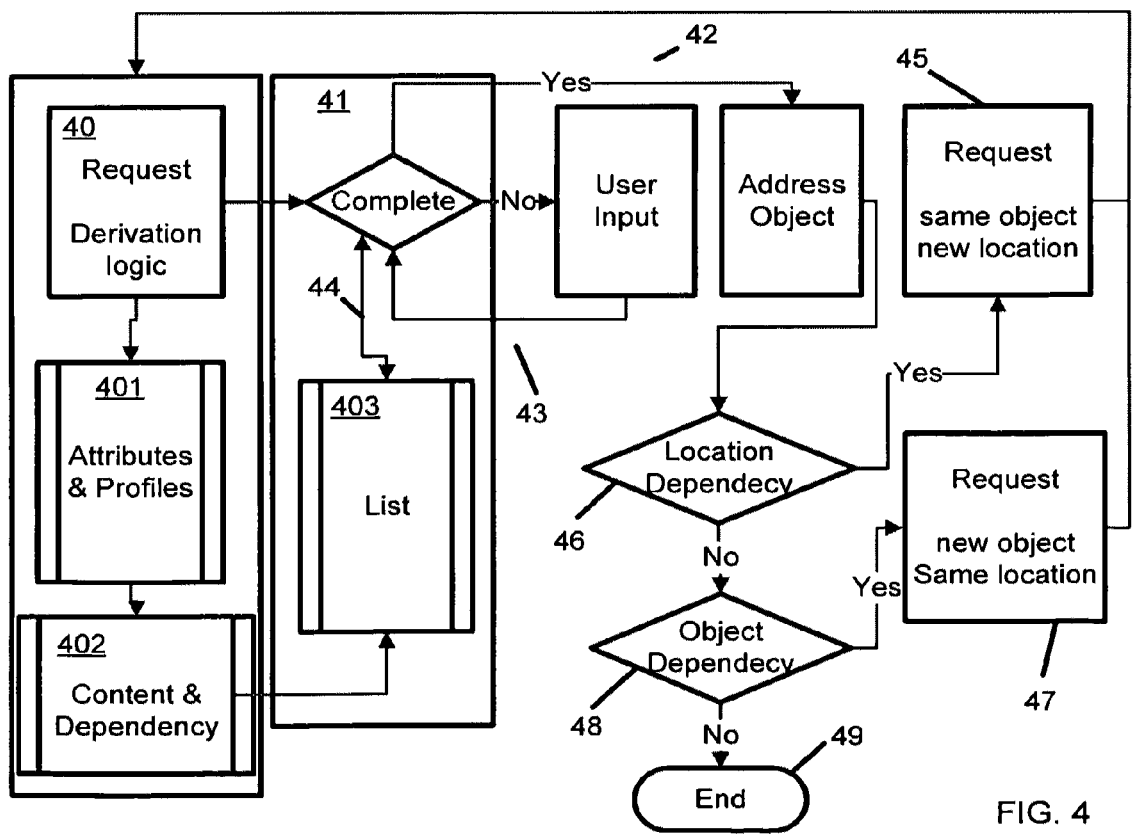
FIG. 4 illustrates an exemplary embodiment of an overall flow diagram.

In an exemplary embodiment, the set of dependency rules may be correlated to a workflow for arranging the execution of the set of dependency rules. FIG. 4 illustrates aspects of an implementation of such a workflow.

FIG. 4 illustrates an exemplary embodiment of an overall flow diagram. First a request to maintain the database is received. The request may be a request for creating a new data object, deleting a data object, changing an attribute, etc. The request determines which dependency rules that apply for the specific request. In an exemplary implementation of the derivation logic 401, the dependency rules are implemented in terms of profiles. First profile content is build. The profiles may be organized in profiles which call other profiles, and profiles which directly set attributes. As an example, in dependence upon the object type identifier, the dependent profiles are determined and the dependent attribute values are determined. If any of the profiles or attributes again is dependent upon profiles or attributes, also these second order dependencies are determined, so for the data object in question all attribute values to be set are identified, thereby determining the total content of the dependencies 402. A list of tasks 403 to be performed is generated. That is a listing relevant attributes to be addressed with respect to addition, removal, setting and updating.

In a next step it is tested whether all inputs are available for the request. That is, it is tested 44 whether all relevant inputs are known in order to fill out all the attribute values that were identified in the determination process 401, 402 as provided in the list 403. If this is the case, the relevant object is addressed 42. If all relevant inputs are not available, user input is requested 43 until the request is complete. User input may also be requested in order to verify validity of available data. In a next step 46, location dependency is checked, if a dependency rule specifies a location dependency 45, the same object is requested in a new location. The request may include the steps of inheriting the global data from the parent request.

If no, or no further, location dependencies are present, the object is checked for object dependencies 48. If a dependency rule specifies an object dependency, a new dependent object is requested in the same location 47, the request may include the step of inheriting data from dependent attributes. If no, or no further, object dependencies are present, the request is ended 49.

The invention can be implemented by means of hardware, software, firmware or any combination of these. The invention or some of the features thereof can also be implemented as software running on one or more data processors and/or digital signal processors. The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of handling data in a data sharing system including a unified database, the data sharing system comprising a set of master data each comprising data objects, each data object comprising an object type identifier and a set of attributes, the method comprising:
    coupling at least one set of object type identifier and attribute in accordance with a set of dependency rules, wherein the dependency rules specify links between attributes of a same data object, or maps one set of attributes of a data object to another set of attributes of the same data object or of another data object,
    wherein the method is performed by a digital signal processor.

2. The method according to claim 1, wherein the set of data objects comprises:
   a subset of global data objects, each global data object comprising a global object identifier and a set of global attributes; and
   a subset of local data objects, each local data object comprising a local type identifier and a set of local attributes.

3. The method according to claim 2, wherein the subset of local data objects is associated to at least one global data object.

4. The method according to claim 1, further comprising updating the set of data objects in accordance with couplings as specified by the set of dependency rules.

5. The method according to claim 1, wherein the dependency rules are customized to a business operation.

6. The method according to claim 1, wherein the dependency rules specify a mapping between a first set of attributes for a first data object to a second set of attributes for a second data object.

7. The method according to claim 6, wherein the mapping between the first and second set of attributes is executed by setting attributes of the second set of attributes independent of a setting of the first set of attributes.

8. The method according to claim 6, wherein the mapping between the first and second set of attributes is executed by setting attributes of the second set of attributes based on attributes of the first set of attributes.

9. The method according to claim 1, wherein the dependency rules specify a mapping between a first set of attributes for a first data object to a second set of attributes for the first data object.

10. The method according to claim 9, wherein the mapping between the first and second set of attributes is executed by setting attributes of the second set of attributes independent of a setting of the first set of attributes.

11. The method according to claim 1, wherein the dependency rules specify to create a data object.

12. The method according to claim 1, wherein the dependency rules specify to delete a data object.

13. The method according to claim 1, wherein the dependency rules specify to maintain a data object.

14. The method according to claim 1, wherein the dependency rules specify to request user input.

15. The method according to claim 1, wherein the dependency rules specify idle and active attributes.

16. The method according to claim 1, wherein the set of dependency rules is correlated to a workflow for arranging execution of the set of dependency rules.

17. The method according to claim 16, wherein the workflow is initiated upon a user request.

18. The method according to claim 1, wherein the data sharing system is an ERP system.

19. A computer program product embodied on a non-transitory computer-readable medium and comprising the method according to claim 1.

20. A data sharing system, comprising:
   a set of master data each comprising data objects, each data object comprising an object type identifier and a set of attributes stored in a unified database;
   wherein at least one set of object type identifier and attribute is coupled in accordance with a set of dependency rules, and wherein the dependency rules specify links between attributes of a same data object, or maps one set of attributes of a data object to another set of attributes of the same data object or of another data object.

* * * * *